(12) United States Patent
Mori (10) Patent No.: US 11,331,958 B2
(45) Date of Patent: May 17, 2022

(54) STUD PIN AND STUDDED TIRE (71) Applicant: The Yokohama Rubber Co., LTD., Tokyo (JP)

(72) Inventor: Masakazu Mori, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 138 days.

(21) Appl. No.: 16/489,336

(22) PCT Filed: Feb. 28, 2017

(86) PCT No.: PCT/JP2017/007671
§ 371 (c)(1),
(2) Date: Aug. 27, 2019

(87) PCT Pub. No.: WO2018/158798
PCT Pub. Date: Sep. 7, 2018

(65) Prior Publication Data
US 2020/0062041 A1 Feb. 27, 2020

(51) Int. Cl.
*B60C 11/16* (2006.01)
(52) U.S. Cl.
CPC ...... *B60C 11/1675* (2013.01); *B60C 11/1625* (2013.01); *B60C 11/1643* (2013.01); *B60C 11/1656* (2013.01); *B60C 11/1668* (2013.01)
(58) Field of Classification Search
CPC ............. B60C 11/1625; B60C 11/1643; B60C 11/1656; B60C 11/1668
See application file for complete search history.

(56) References Cited

U.S. PATENT DOCUMENTS

2004/0163746 A1* 8/2004 Eromaki ................ B29D 30/66
152/210
2013/0000807 A1 1/2013 Pons et al.
(Continued)

FOREIGN PATENT DOCUMENTS

DE 1850309 U * 4/1962
FI 123780 B * 10/2013
(Continued)

OTHER PUBLICATIONS

Machine translation for Finland 123780 (Year: 2021).*
(Continued)

*Primary Examiner* — Steven D Maki
(74) *Attorney, Agent, or Firm* — Thorpe North & Western (57) ABSTRACT

A stud pin includes a tip including an end surface that comes into contact with a road surface, a body portion that supports the tip; and a lower flange connected to the body portion at an end on an opposite side to the end surface. A profile shape of the lower flange is an anisotropic shape in which, of imaginary rectangles circumscribing the profile shape, a first smallest rectangle with the shortest side of its four sides being the shortest and/or a second smallest rectangle with the longest side of its four sides being the shortest includes short sides and long sides of different lengths. The profile shape includes four or more first protrusion portions that project in the longitudinal direction parallel with the long sides and two second protrusion portions that project in the lateral direction parallel with the short sides.

17 Claims, 7 Drawing Sheets

(56) References Cited

U.S. PATENT DOCUMENTS

2017/0349006 A1    12/2017  Matsumoto
2017/0368889 A1*  12/2017  Ajoviita .............. B60C 11/1675

FOREIGN PATENT DOCUMENTS

| | | | |
|---|---|---|---|
| FI | 125983 B | * | 5/2016 |
| JP | 2015-136942 | | 7/2015 |
| KR | 10-2015-0071293 | | 6/2015 |
| WO | WO 2014/027145 | | 2/2014 |
| WO | WO 2014/027146 | | 2/2014 |
| WO | WO 2015/139860 | | 9/2015 |
| WO | WO 2016/098394 | | 6/2016 |

OTHER PUBLICATIONS

Machine translation for German 1850309 (Year: 2021).*
International Search Report for International Application No. PCT/JP2017/007671 dated Jun. 6, 2017, 4 pages, Japan.

* cited by examiner

STUD PIN AND STUDDED TIRE

TECHNICAL FIELD

The present technology relates to a stud pin mounted in a tire and a studded tire.

BACKGROUND ART

In the related art, studded tires for use on icy and snowy roads include stud pins installed in a tread portion and provide grip on icy road surface.

Typically, a stud pin is embedded in a pin inserting hole (hereinafter, also referred to as simply "hole") provided in the tread portion. When a stud pin is embedded in a hole, the hole expands in diameter. By inserting the stud pin into the hole in this state, the stud pin is firmly fastened in the hole and the tread portion and mounted in the tread portion. As a result, the stud pin is prevented from falling out from the hole due to receiving breaking or accelerating forces or lateral forces from the road surface when the studded tire rolls.

When the stud pin falls out from the studded tire, the stud pin falls out while rotating in the hole. Thus, to prevent the stud pin from falling out, it is preferable that the stud pin does not rotate in the hole. As such, in many technologies, the profile shape of an upper flange or a lower flange of the stud pin has been given a non-arc shape.

For example, a known stud pin includes a lower flange with a profile shape that includes protrusion portions projecting in an arc shape in opposite directions and curved portions recessed in an arc shape in an orthogonal direction orthogonal to the projection direction of the protrusion portions, wherein the stud pin is anisotropic in that the length of the profile shape in the projection direction of the protrusion portion is longer than the length of the profile shape in the orthogonal direction (see International Patent Publication No. WO 2014/027145).

The stud pin described above includes a lower flange with a profile shape that is a non-arc anisotropic shape. Thus, the stud pin does not easily fall out from the pin inserting hole. Typically, when the stud pin receives shear force from the icy road surface, the stud pin inclines so as to fall against the pin inserting hole in which it is installed. This reduces the fastening force on the stud pin from the hole. In this way, the stud pin can easily rotate about the center axis in the pin installing hole. Additionally, when the stud pin receives a large shear force from an icy road surface and the fastening force of the pin inserting hole is reduced, the stud pin rotates about the center axis. As a result, the resistance of the pin inserting hole and the tread portion holding the stud pin in the pin inserting hole against the shear force received from an icy road surface is decreased, and the stud pin is more likely to fall out from the pin inserting hole.

The stud pin described above including an upper flange or a lower flange with a non-arc shaped profile shape can suppress the stud pin from falling out but cannot sufficiently suppress the rotation of the stud pin which is the initial cause of the falling out. It is conceivable that by suppressing the rotation of the stud pin, the stud pin falling out can be further suppressed.

SUMMARY

The present technology provides a stud pin that does not easily fall out from a pin inserting hole of a studded tire and is capable of suppressing the rotation of a stud pin which is the initial cause of the stud pin falling out and a studded tire installed with the stud pin.

One aspect of the present technology is a stud pin installable in a tire. The stud pin includes a tip including an end surface that comes into contact with a road surface; a body portion that supports the tip so that the tip projects from an end surface on one side of the body portion; and a lower flange connected to an end of the body portion on an opposite side to the end surface.

A profile shape of the lower flange as viewed from an arrangement direction of the tip, the body portion, and the lower flange, is an anisotropic shape in which, of imaginary rectangles circumscribing the flange profile shape, a first smallest rectangle with the shortest side of its four sides being smallest and/or a second smallest rectangle with the longest side of its four sides being smallest includes short sides and long sides of different lengths.

The profile shape includes four or more first protrusion portions that project toward a longitudinal direction parallel with the long sides and two second protrusion portions that project toward a lateral direction parallel with the short sides.

Preferably, the first protrusion portion is constituted by two pairs thereof;

the profile shape comprises two first recess portions curved toward a centroid of the profile shape and disposed between each of the pairs of first protrusion portions; and the profile shape further comprises four second recess portions curved toward the centroid, disposed between each of the second protrusion portions and one of the first protrusion portions, and smoothly connect to one of the first protrusion portions.

Preferably, a recess depth of the first recess portions is equal to or greater than a recess depth of the second recess portions.

Preferably, the two first recess portions are formed with a line symmetrical shape with respect to a first imaginary straight line parallel with the lateral direction that extends through the centroid and/or formed with a line symmetrical shape with respect to a second imaginary straight line parallel with the longitudinal direction that extends through the centroid.

Preferably, the four second recess portions are formed with a line symmetrical shape with respect to a first imaginary straight line parallel with the lateral direction that extends through the centroid and/or formed with a line symmetrical shape with respect to a second imaginary straight line parallel with the longitudinal direction that extends through the centroid.

Preferably, the two second protrusion portions comprise two linear portions parallel with the longitudinal direction; and the linear portions are portions projecting the most in the lateral direction.

Preferably, the two linear portions are formed with a line symmetrical shape with respect to a first imaginary straight line parallel with the lateral direction that extends through the centroid and/or formed with a line symmetrical shape with respect to a second imaginary straight line parallel with the longitudinal direction that extends through the centroid.

Preferably, the two second protrusion portions comprise two linear portions parallel with the longitudinal direction;

the linear portions are portions projecting the most in the lateral direction; and both ends of each of the two linear portions connect with two second recess portions of the four second recess portion.

Another aspect of the present technology is a studded tire installed with a stud pin, comprising a tread portion installed with the stud pin described above with the longitudinal direction facing a tire circumferential direction.

Another aspect of the present technology is a studded tire installed with a stud pin, comprising a tread portion installed with the stud pin described above with the lateral direction facing a tire circumferential direction.

According to the stud pin and the studded tire described above, the stud pin does not easily fall out from a pin inserting hole of a studded tire, and the rotation of a stud pin which is the initial cause of the stud pin falling out can be suppressed.

DETAILED DESCRIPTION

Overall Description of Tire

Figure 1:
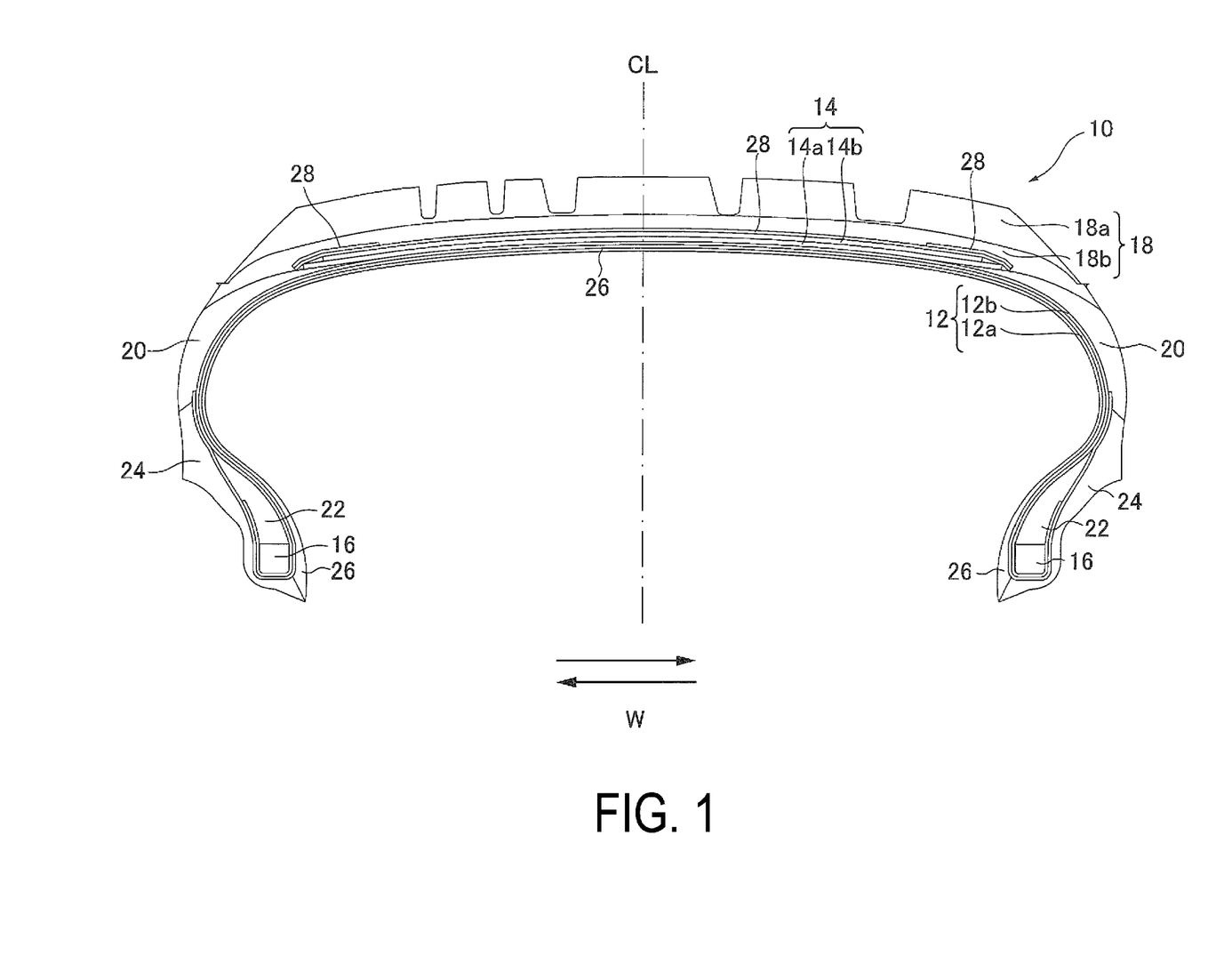
FIG. 1 is a tire cross-sectional view illustrating an example of a cross section of a tire of a present embodiment.
Figure 2:
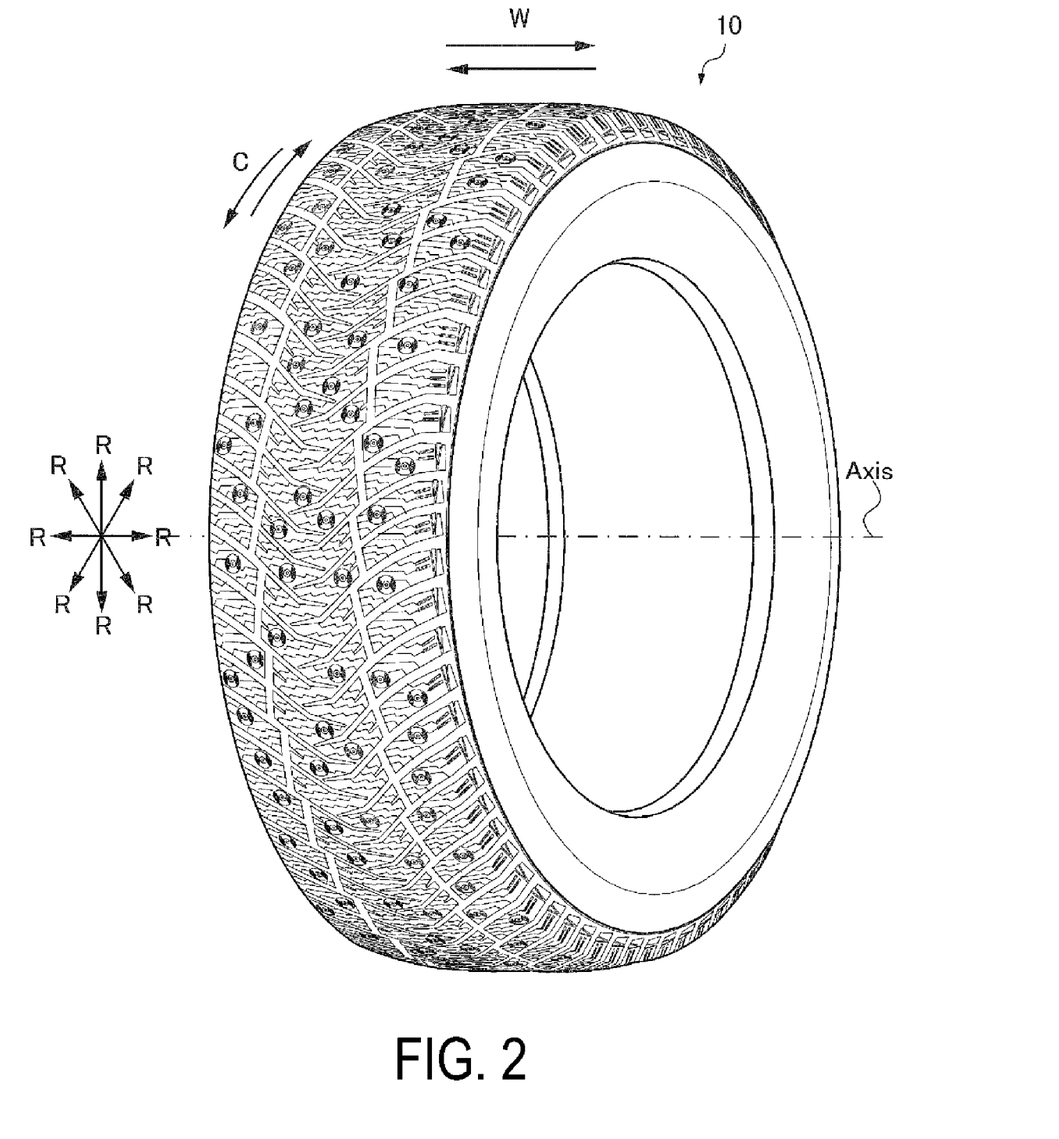
FIG. 2 is a perspective view of the tire of the present embodiment.

Hereinafter, a studded tire of the present embodiment is described. FIG. 1 is a tire cross-sectional view illustrating an example of a cross-section of a studded tire (hereinafter also referred to as "tire") 10 of the present embodiment. FIG. 2 is a perspective view of the tire 10.

The tire 10 is a tire with stud pins embedded in a tread portion (the stud pins are not illustrated in FIGS. 1 and 2).

The tire 10 is, for example, a tire for a passenger vehicle. A tire for a passenger vehicle refers to a tire specified in Chapter A of the JATMA Year Book 2012 (standards of The Japan Automobile Tyre Manufacturers Association, Inc.). The tire can also be a small truck tire specified in Chapter B or a truck tire or bus tire specified in Chapter C.

Values of the dimensions of various pattern elements are described in detail below as example values for a tire for a passenger vehicle. However, the studded tire is not limited to these example values.

"Tire circumferential direction C" described below (see FIG. 2) refers to the direction the tread surface rotates when the tire 10 rotates about a tire rotation axis Axis (see FIG. 2). "Tire radial direction R" refers to the direction that extends radially orthogonal to the tire rotation axis Axis. "Outward in the tire radial direction" refers to the direction away from the tire rotation axis Axis in the tire radial direction R. "Tire lateral direction W" refers to the direction parallel with the tire rotation axis Axis. "Outward in the tire lateral direction" refers to the direction away from a tire equator line CL (see FIG. 3) of the tire 10.

Tire Structure

The tire 10 includes a carcass ply 12, a belt 14, and bead cores 16 as framework members. The tire 10 also mainly includes a tread rubber 18, side rubbers 20, bead filler rubbers 22, rim cushion rubbers 24, and an innerliner rubber 26 around the framework members.

The carcass ply 12 includes carcass ply members 12a, 12b that are formed from organic fibers covered with rubber and that are wound between the pair of bead cores 16 of an annular shape so as to be formed into a toroidal shape. In the tire 10 illustrated in FIG. 1, the carcass ply 12 is made of the carcass ply members 12a and 12b but may also be made of a single carcass ply member. The belt 14 is provided outward of the carcass ply 12 in the tire radial direction and is constituted of two belt members 14a, 14b. The belt 14 is a member formed from steel cords covered with rubber, the steel cords being arranged inclined at a predetermined angle, for example, 20 to 30 degrees, with respect to the tire circumferential direction C. The width in the tire lateral direction of the belt member 14a that is a lower layer is greater than the width of the belt member 14b that is the upper layer. The steel cords of the two layers of the belt members 14a and 14b are inclined from the tire circumferential direction C toward the tire lateral direction W in mutually different directions. As such, the belt members 14a, 14b are crossing layers serving to suppress expansion of the carcass ply 12 due to the pressure of the air in the tire.

The tread rubber 18 is disposed outward of the belt 14 in the tire radial direction. Both end portions of the tread rubber 18 are connected to the side rubbers 20 to form sidewall portions. The tread rubber 18 is made of two layers of rubber, namely an upper layer tread rubber 18a provided on the outer side in the tire radial direction and a lower layer tread rubber 18b provided on the inner side in the tire radial direction. The rim cushion rubbers 24 are provided at the ends of the side rubbers 20 on the inner side in the tire radial direction, and come into contact with the rim on which the tire 10 is mounted. The bead filler rubbers 22 are provided outward of the bead cores 16 in the tire radial direction so as to be interposed between a portion of the carcass ply 12 before where it is wound around the bead cores 16 and a portion of the carcass ply 12 after where it is wound around the bead cores 16. The innerliner rubber 26 is provided on the inner surface of the tire 10 facing a tire cavity region that is filled with air and is surrounded by the tire 10 and the rim.

In addition, the tire 10 includes a belt cover layer 28 formed from organic fiber covered with rubber that covers the belt 14 from the outer side in the tire radial direction of the belt 14.

The tire 10 has such a tire structure, but the tire structure of the present embodiment is not limited to the tire structure illustrated in FIG. 1.

Tread Pattern

Figure 3:
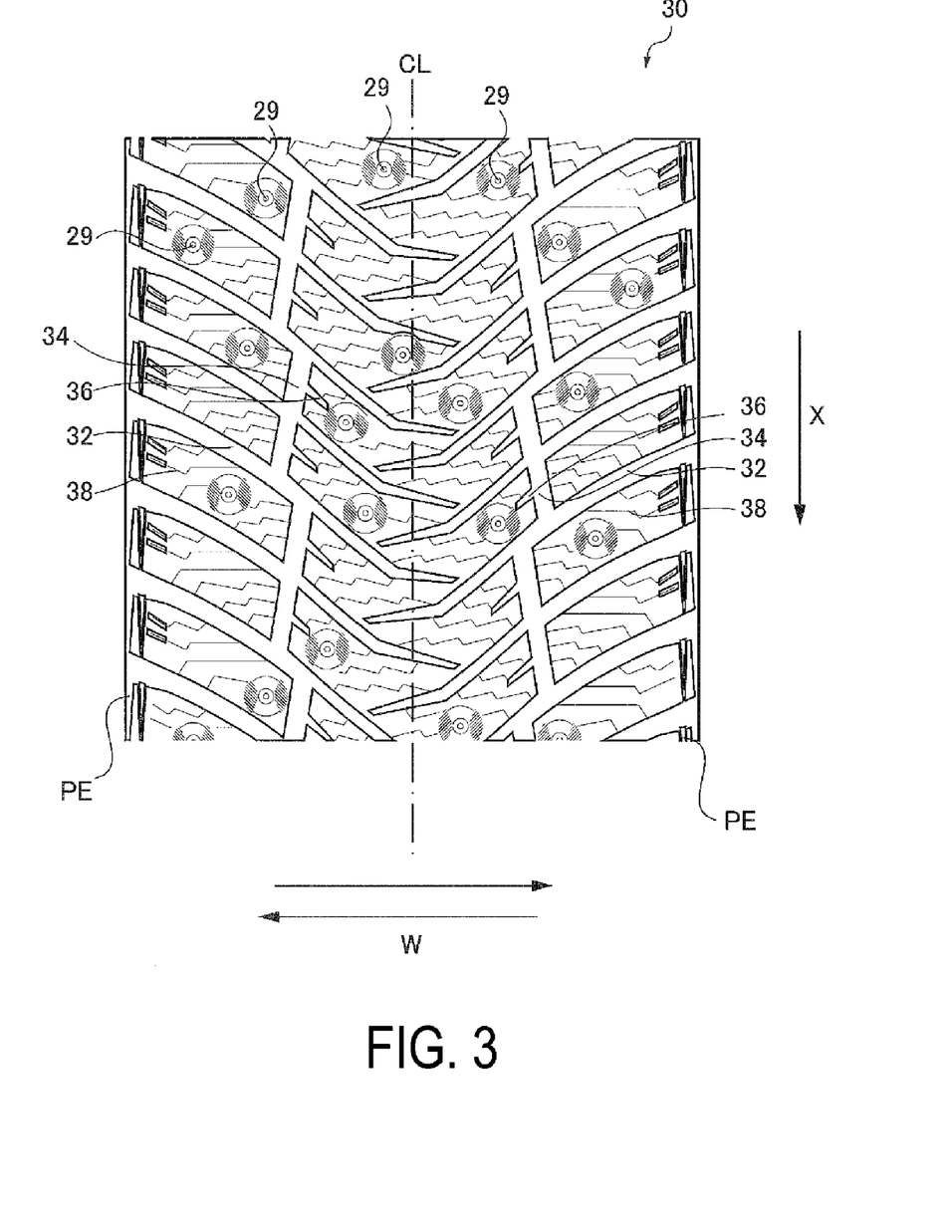
FIG. 3 is a developed plan view illustrating a portion of an example of a tread pattern of the studded tire of the present embodiment, developed on a plane.

FIG. 3 is a developed plan view illustrating a portion of an example of the tread pattern, namely a tread pattern 30, of the tire 10 developed on a plane. In FIG. 3, the stud pins installed in the tread portion are omitted from the illustration. As illustrated in FIG. 3, the tire 10 has a designated rotation direction X indicating a one-way direction along the tire circumferential direction C. Orientation information of the rotation direction X is illustrated by an information display portion including numbers, symbols, and the like (e.g., an arrow symbol) on the sidewall surface of the tire 10. The stud pins (see FIG. 4A) are installed in a plurality of pin inserting holes 29 illustrated in FIG. 3.

The tread pattern 30 includes an inclined groove 32, a circumferential direction communicating groove 34, a projecting groove 36, and a sipe 38.

A plurality of the inclined groove 32 are formed at predetermined intervals in the tire circumferential direction (vertical direction in FIG. 3).

The inclined groove 32 extends in a direction opposite (the up direction in FIG. 3) the tire rotation direction X (the down direction in FIG. 3) and outward in the tire lateral direction. The inclined groove 32 has a starting end at a position near the tire equator line CL on one side of the tire equator line CL in the tire lateral direction W, crosses the tire equator line CL and advances toward the other side in the tire lateral direction W, and ends at a pattern end PE.

The groove width of the inclined groove 32 gradually increases from the starting end near the tire equator line CL. The inclination with respect to the tire lateral direction W of the inclined groove 32 is the smallest in a region near the tire equator line CL including the starting end and, after crossing the tire equator line CL, bends so as that the inclination angle with respect to the tire lateral direction W increases, and advances outward in the tire lateral direction in a direction opposite the tire rotation direction X. Furthermore, the inclination angle gradually decreases with advancement outward in the tire lateral direction. The inclined grooves 32 configured as described above are provided on both sides of the tire equator line CL.

The inclined grooves 32 provided on one side of the tire equator line CL of the tread portion are offset with respect to the tire circumferential direction C from the inclined grooves 32 provided on the other side. The starting ends of the inclined grooves 32 on one side do not connect with the inclined grooves 32 provided on the other side.

Of the plurality of inclined grooves 32 provided in the tire circumferential direction C, the inclined grooves 32 that are adjacent are in communication via the circumferential direction communicating groove 34. More specifically, the circumferential direction communicating groove 34 extends in the tire circumferential direction C from a position partway along one of the inclined grooves 32, crosses a second inclined groove 32 that is adjacent to the first inclined groove 32 in the tire circumferential direction C, and advances to a third inclined groove 32 that is adjacent to the second inclined groove 32. That is, the circumferential direction communicating groove 34 starts at one of the inclined grooves 32 (first inclined groove 32), extends along the tire circumferential direction C from the first inclined groove 32 at which the circumferential direction communicating groove 34 starts, and terminates at a second inclined groove 32. In this way, the circumferential direction communicating groove 34 is provided so as to connect three of the inclined grooves 32 that are adjacent along the tire circumferential direction C. The circumferential direction communicating groove 34 is inclined with respect to the tire circumferential direction C so as to approach the tire equator line CL with advancement in the direction opposite to the tire rotation direction X.

The projecting groove 36 projects in a direction toward the tire equator line CL from the circumferential direction communicating groove 34, and is provided so as to terminate prior to reaching the tire equator line CL.

Land portions of the tread portion are separated into a center region and shoulder regions by the inclined grooves 32 and the circumferential direction communicating grooves 34. A plurality of the sipes 38 connected to the inclined grooves 32 and the circumferential direction communicating grooves 34 are provided in the center region and both of the shoulder regions of the tread portion.

Furthermore, the plurality of the pin inserting holes 29 are provided in the center region and both of the shoulder regions of the tread portion.

The inclined groove 32, the circumferential direction communicating groove 34, and the projecting groove 36 have a groove depth of, for example, from 8.5 mm to 10.5 mm, and a maximum groove width of 12 mm. The tread pattern illustrated in FIG. 3 is an example, and the tread pattern of the tire in which the stud pins of the present embodiment are installed in is not limited to the embodiment illustrated in FIG. 3.

Stud Pin

Figure 4A:
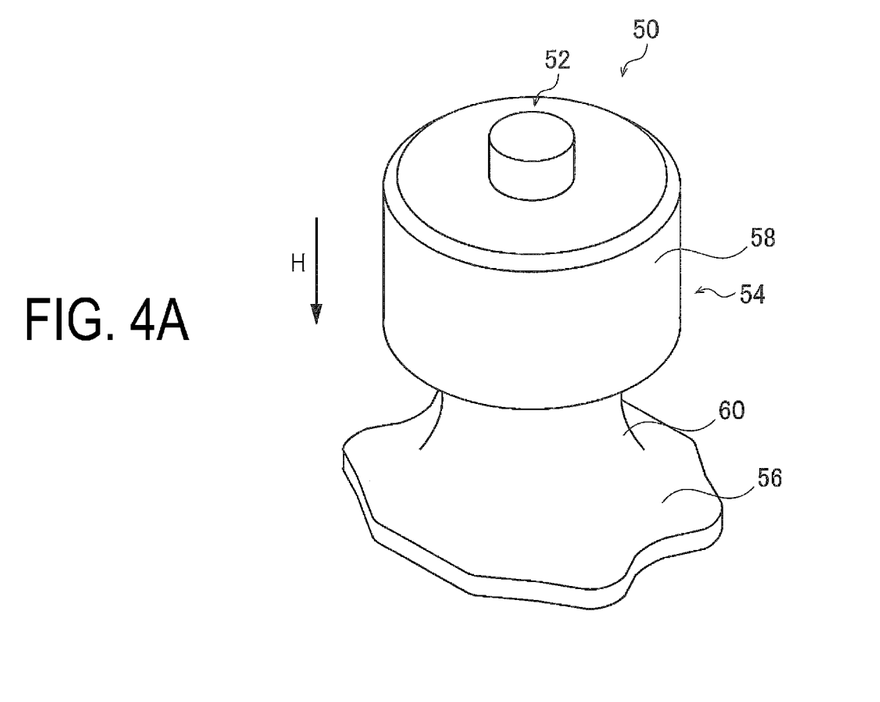
FIG. 4A is a perspective view of a stud pin of the present embodiment.
Figure 4B:
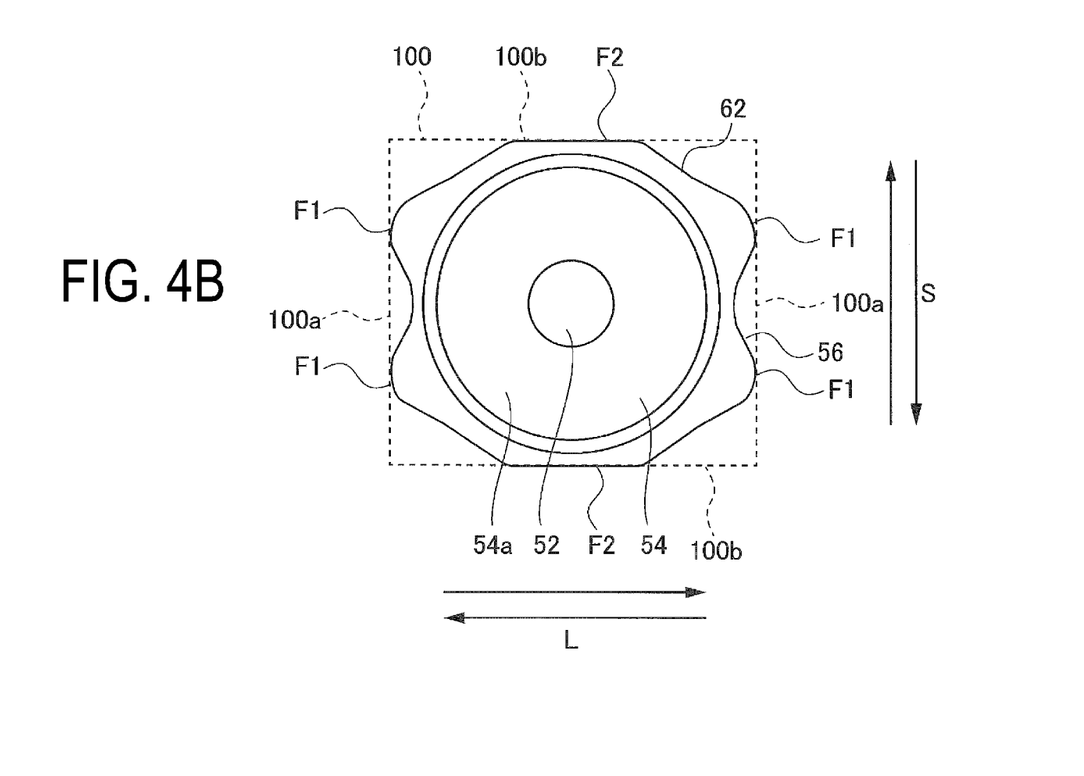
FIG. 4B is a plan view of the stud pin of the present embodiment.

FIG. 4A is a perspective view of a stud pin 50 of the present embodiment. FIG. 4B is a plan view of the stud pin 50 of the present embodiment.

The stud pin 50 includes a tip 52, a body portion 54, and a lower flange 56. The body portion 54 includes an upper flange 58 and a shank portion 60. When installed in the pin inserting holes 29 of the tire 10, the body portion 54 and the lower flange 56 are embedded in the tread rubber 18 (see FIG. 1) and are in contact with the tread rubber 18.

The tip 52 includes a tip end surface that comes into contact with a road surface. The tip 52 is formed from tungsten carbide or a similar hard metal. According to an embodiment, the tip 52 may be formed from a cermet material. The tip 52 is fixed in a hole provided in an upper end surface 54a of the body portion 54. The tip 52 of the stud pin 50 is configured to protrude from the tread surface when the stud pin 50 is installed in the tire 10.

The body portion 54 is a portion that supports the tip 52 with the tip 52 projecting from the upper end surface 54a on one side. The body portion 54 extends in the direction opposite to the projection direction of the tip 52. The extension direction of the body portion 54 is also the direction in which the tip 52, the body portion 54, and the lower flange 56 are arranged, and this direction is referred to as the H-direction.

The upper flange 58 of the body portion 54 is configured so that, when embedded in the tread portion of the tire 10, the tip 52 protrudes from the tread surface. The tip 52 is fixed on upper end surface 54a of the body portion 54.

The lower flange 56 is configured to come into contact with a bottom of the pin inserting hole 29, when embedded in the tread portion of the tire 10. The lower flange 56 is connected to the end of the shank portion 60 on the opposite side of the upper end surface 54a of the body portion 54.

The shank portion 60 is the portion that connects the upper flange 58 and the lower flange 56. The cross section of the shank portion 60 in the direction orthogonal to the H-direction is thinner than the cross sections of the upper flange 58 and the lower flange 56.

The material of the body portion 54 and the lower flange 56 is not particularly limited but is preferably different from the material of the tip 52. According to an embodiment, the body portion 54 and the lower flange 56 are formed from aluminum alloy or the like in order to reduce the weight of the stud pin 50.

In the present embodiment, as illustrated in FIG. 4B, the profile shape of the end surface of the tip 52 is circular when the tip 52 is viewed from the H-direction. According to an embodiment, the profile shape of the end surface of the tip 52 is preferably an elliptical shape, a curved line shape including a plurality of arc shapes, a convex polygonal shape, a concave polygonal shape, or a shape thereof with a portion changed to a linear shape, an arc shape forming a recess portion, or a wavy line shape with undulations.

In the present embodiment, as illustrated in FIG. 4B, the profile shape of the end surface of the upper flange 58 is circular when the upper flange 58 is viewed from the H-direction. However, according to an embodiment, the profile shape of the end surface of the upper flange 58 is preferably an elliptical shape, a curved line shape including a plurality of arc shapes, a convex polygonal shape, a concave polygonal shape, or a shape thereof with a portion changed to a linear shape, an arc shape forming a recess portion, or a wavy line shape with undulations.

A profile shape 62 of the lower flange 56 is an anisotropic shape when the lower flange 56 is viewed from the H-direction. Here, as illustrated in FIG. 4B, the anisotropic shape is a shape in which, of imaginary rectangles circumscribing the profile shape 62 and inclined in various directions, a first smallest rectangle with the shortest side of its four sides being the smallest and/or a second smallest rectangle with the longest side of its four sides being the smallest includes short sides and long sides of different lengths. In FIG. 4B, a first smallest rectangle 100 is illustrated. In this example, the first smallest rectangle 100 includes a side 100a corresponding to the shortest of the shortest sides. The first smallest rectangle 100 also corresponds to the second smallest rectangle. In other words, the second smallest rectangle includes a side 100b corresponding to the shortest of the longest sides. The side 100a of the sides of the first smallest rectangle 100, which is also the second smallest rectangle, is a short side, and the side 100b is a long side. Accordingly, the profile shape 62 of the lower flange 56 is an anisotropic shape.

The profile shape 62 of the lower flange 56 with such an anisotropic shape includes four first protrusion portions F1 that project in the longitudinal direction L parallel with the long side (side 100b) and two second protrusion portions F2 that project in the lateral direction S parallel with the short side (side 100a). Hereinafter, the side 100b is referred to as "long side 100b", and the side 100a is referred to as "short side 100a".

Here, "first protrusion portion F1" means the portion formed in a protruding shape protruding in the longitudinal direction L located in a region separated in the longitudinal direction L a distance equal to or greater than half of the distance from a straight line parallel with the lateral direction S that goes through the center of the first smallest rectangle 100 (the intersection point of two diagonal lines) to the short side 100a from the parallel straight line. "Protruding shape" refers to the shape of a portion that approaches the parallel straight line (a straight line parallel with the lateral direction S that extends through the center of the first smallest rectangle 100) as it extends outward on both sides to the outer circumference of the profile shape 62 from a point on the profile shape 62.

"Second protrusion portion F2" is the portion formed in a protruding shape protruding in the lateral direction S located in a region separated in the lateral direction S a distance equal to or greater than half of the distance from a straight line parallel with the longitudinal direction L that goes through the center of the first smallest rectangle 100 (the intersection point of two diagonal lines) to the long side 100b from the parallel straight line. "Protruding shape" refers to the shape of a portion that approaches the parallel straight line (a straight line parallel with the longitudinal direction L that extends through the center of the first smallest rectangle 100) as it extends outward on both sides to the outer circumference of the profile shape 62 from a point on the profile shape 62.

In the present embodiment, the profile shape 62 of the lower flange 56 includes the four first protrusion portions F1 and the two second protrusion portions F2. Two of the first protrusion portions F1 face a first direction of the longitudinal direction L, and the other two first protrusion portions F1 face a second direction opposite to the first direction. One of the second protrusion portions F2 faces a third direction of the lateral direction S, and the other second protrusion portion F2 faces a fourth direction opposite to the third direction. The number of the first protrusion portions F1 facing the first direction in the longitudinal direction L is the same as the number of first protrusion portions F1 facing the second direction. According to an embodiment, preferably, three of the first protrusion portions F1 face the first direction of the longitudinal direction L and the other first protrusion portion F1 faces the second direction opposite to the first direction, and one of the second protrusion portions F2 faces a third direction of the lateral direction S and the other second protrusion portion F2 faces a fourth direction opposite to the third direction.

Additionally, according to an embodiment, the profile shape 62 of the lower flange 56 preferably includes five, six, or seven first protrusion portions F1 and two second protrusion portions F2. In this embodiment, the number of the first protrusion portions F1 facing the first direction in the longitudinal direction L may be the same as or different to the number of first protrusion portions F1 facing the second direction.

In the present embodiment, the profile shape 62 of the lower flange 56 includes four of the first protrusion portions F1 and two second protrusion portions F2. This makes the stud pin 50 harder to fall out from the pin inserting hole 29 of the tire 10 and suppresses the rotation of the stud pin 50 which is an initial cause of the stud pin 50 falling out.

Specifically, the profile shape 62 of the lower flange 56 includes the large second protrusion portion F2 along the long side 100b. This increases the holding strength to prevent the movement of the stud pin 50 that receives shear force from an icy road surface to incline and fall out from the pin inserting hole. As a result, the stud pin 50 does not easily fall out from the pin inserting hole 29.

As described above, prior to the stud pin 50 falling out from the pin inserting hole 29, the stud pin 50 rotates in the pin inserting hole 29. When the tire 10 rotates, the resistance of the pin inserting hole 29 and the tread rubber 18 holding the stud pin 50 in the pin inserting hole 29 against the shear force received from an icy road surface is decreased, and the stud pin 50 is more likely to fall out from the pin inserting hole 29. However, the profile shape 62 of the lower flange 56 of the stud pin 50 includes four of the first protrusion portions F1 and has undulations, and the lower flange 56 is fastened and fixed in the pin inserting hole 29 with the tread rubber 18 deformed corresponding to these undulations. Thus, a gap is not easily formed between the stud pin 50 and the pin inserting holes 29 due to the stud pin 50 inclining in a collapsing direction when the stud pin 50 receives a shear force from an icy road surface. As a result, the lower flange 56 can be tightly fastened by the tread rubber 18 (the inner wall surface of the pin inserting hole), and the rotation of the stud pin 50 in the pin inserting holes 29 which is an initial cause of the stud pin 50 falling out can be suppressed. Accordingly, the stud pin 50 of the present embodiment can suppress the stud pin 50 from falling out better than known stud pins with a non-arc shape for the profile shape of the lower flange. Furthermore, even when the stud pin 50 receives shear force from an icy road surface, a gap between the stud pin 50 and the pin inserting hole 29 is not easily formed, and the stud pin 50 is not easily moved out of position in the pin inserting hole 29 (does not come loose). As a result, the stud pin 50 does not easily fall out from the pin inserting hole 29, the shear force between the stud pin 50 and an icy road surface is efficiently transferred to the belt 14, to the entire studded tire 10, and to the vehicle mounted with the studded tire 10. Thus, the braking and driving properties and controllability on icy road surfaces is improved.

Figure 5:
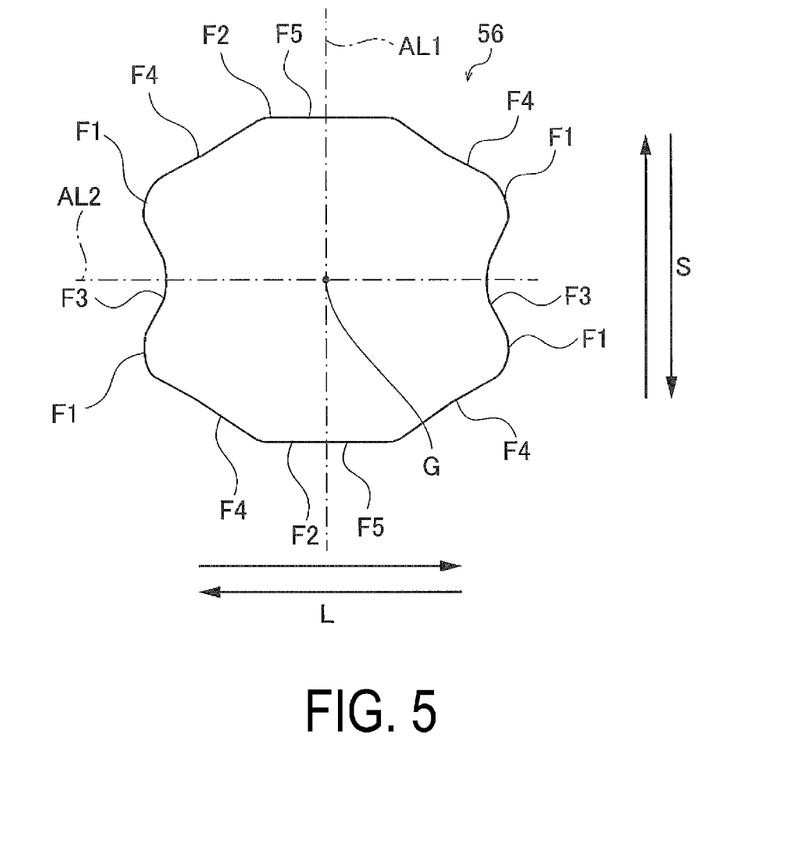
FIG. 5 is a diagram illustrating the profile shape of the lower flange according to an embodiment.

FIG. 5 is a diagram illustrating the profile shape 62 of the lower flange 56 according to an embodiment.

According to an embodiment, as illustrated in FIG. 5, the first protrusion portion F1 is constituted by two pairs of first protrusion portions F1. In other words, when in the plan view of the paper of FIG. 5, two first protrusion portions F1 projecting leftward in the longitudinal direction L is defined as one pair, and two first protrusion portions F1 projecting rightward in the longitudinal direction L is defined as the other pair. Here, the profile shape 62 of the lower flange 56 preferably includes two first recess portions F3 that are curved toward a centroid G of the profile shape 62 and are each disposed between one of the pairs of the first flange protrusion portions F1. Here, the profile shape 62 preferably further includes four second recess portions F4 that are curved toward the centroid G, are disposed between each of the second protrusion portions F2 and one of the first protrusion portions F1, and smoothly connect to one of the first protrusion portions F1.

The profile shape 62 of the lower flange 56 includes the first recess portions F3. Thus, when the lower flange 56 comes into contact with the inner wall surface of the pin inserting holes 29, the area of the contact surface in the lateral direction S is increased. This improves the holding strength preventing the movement of the stud pin 50 to fall out of the pin inserting hole 29. As a result, the stud pin 50 can be suppressed from falling out from the pin inserting hole 29.

Additionally, the profile shape 62 of the lower flange 56 includes the second recess portion F4 at four sections, forming four recesses along the circumference of the profile shape 62. As a result, the installing fingers of a stud pin installation device used in installing the stud pin 50 into the pin inserting hole 29 can more easily grip the lower flange 56 of the stud pin 50. In other words, when the installing fingers grip the lower flange 56 with an anisotropic shape, the stud pin 50 is gripped such that the anisotropic shape takes a suitable orientation and can be installed in the pin inserting hole 29. This improves pin installation properties.

According to an embodiment, as illustrated in FIG. 5, the recess depth of the first recess portions F3 is preferably the same as the recess depth of the second recess portions F4 or greater than the recess depth of the second recess portions F4. Here, "recess depth" refers to the distance from a straight line connecting two of the first recess portions F3 on either side of the first recess portion F3 or the second recess portion F4 or a straight line connecting one of the first protrusion portions F1 to one of the second protrusion portions F2 to a point located furthest from the first recess portion F3 or the second recess portion F4. With a shape in which the recess depth is defined as such, the area of the contact surface in the lateral direction S where the lower flange 56 comes into contact with the inner wall surface of the pin inserting hole 29 can be increased, and the recess on the side in the lateral direction S can be enlarged. This allows the rotation of the stud pin 50 to be further suppressed. Furthermore, holding strength to prevent the stud pin 50 from falling out from the pin inserting hole 29 is increased.

According to an embodiment, the curved shape of the first recess portions F3 and the curved shape of the second recess portions F4 are preferably arc shapes with a set radius of curvature. In the case of the curved shape of the first recess portions F3 and the curved shape of the second recess portions F4 being formed with a single radius of curvature, the radius of curvature of the first recess portions F3 is preferably equal to or less than the radius of curvature of the second recess portions F4. For example, to improve the holding strength described above, the radius of curvature of the first recess portions F3 is preferably equal to or less than 50% of the radius of curvature of the second recess portions F4.

According to an embodiment, as illustrated in FIG. 5, the two second protrusion portions F2 include two linear portions F5 parallel with the longitudinal direction L. The linear portions F5 are preferably the portions projecting the most in the lateral direction S. With such a configuration, the installing fingers of a stud pin installation device used in installing the stud pin 50 into the pin inserting hole 29 can more easily grip the lower flange 56 of the stud pin 50. For example, in the case of the linear portions F5 being at the gripping position of the installing fingers, when the gripping position of the installing fingers strays from the predetermined position along the linear portions F5, the range of the linear portions F5 which the installing fingers can grip is large allowing the stud pin 50 to be stability gripped. As a result, the number of times the stud pin 50 is incorrectly installed in the pin inserting holes 29 is reduced.

Figure 6A:
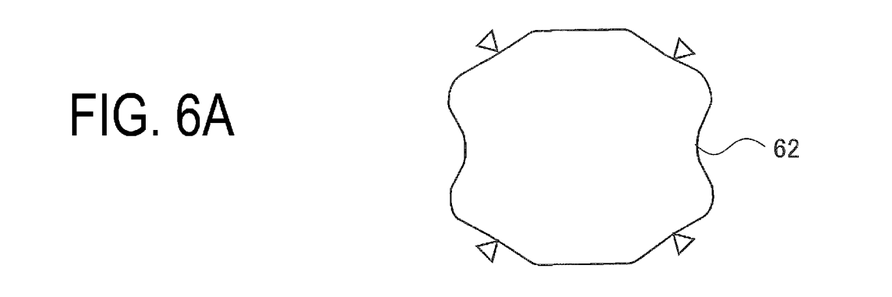
FIGS. 6A to 6D are diagrams illustrating examples of gripping positions of the installing fingers of the stud pin installation device where the lower flange with the profile shape illustrated in FIG. 5 is gripped.
Figure 6B:
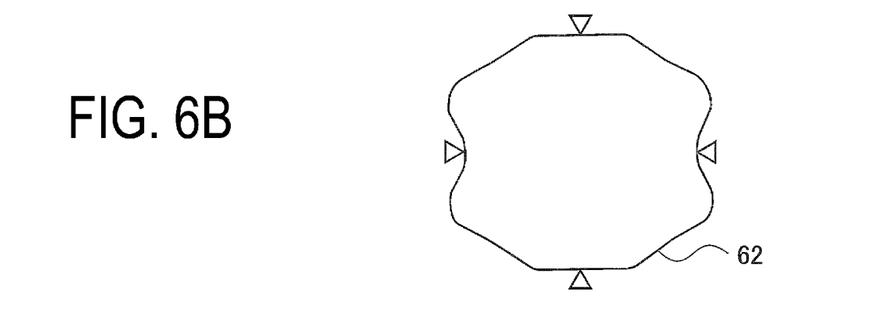
Figure 6C:
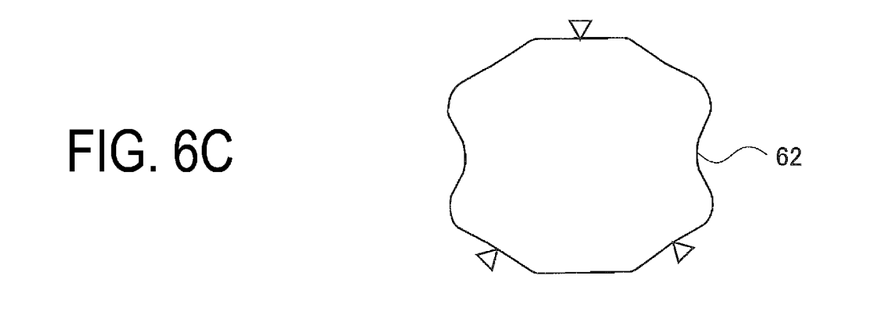
Figure 6D:
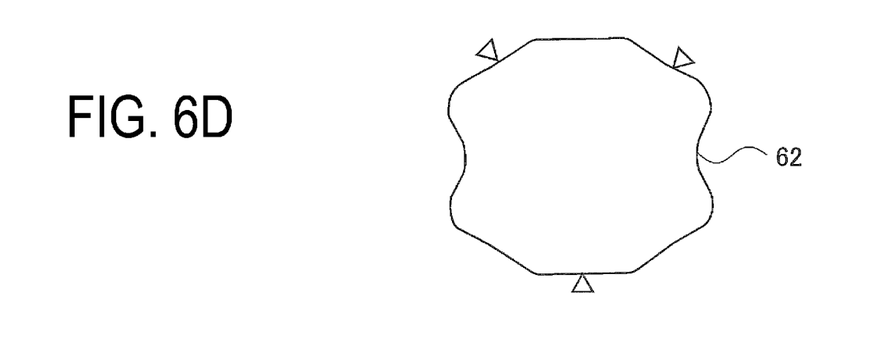

FIGS. 6A to 6D are diagrams illustrating examples of gripping positions of the installing fingers of the stud pin installation device where the lower flange 56 with the profile shape 62 illustrated in FIG. 5 is gripped. In FIGS. 6A to 6D, the positions marked with a "Δ" indicate where the installing fingers grip. FIGS. 6A and 6B illustrate an example in which the installing fingers include four fingers. FIGS. 6C and 6D illustrate an example in which the installing fingers include three fingers. In the examples illustrated in FIGS. 6A to 6D, at least two recess portions are gripping positions, and the other gripping positions correspond to one of the linear portions F5 or a recess portion. In this manner, the installing fingers have various modes, including the installing fingers including three or four fingers, allowing it to grip the stud pin 50 at a position of a recess portion of the lower flange 56. Thus, regardless of the type of installing fingers, the stud pin 50 can be stability installed in the pin inserting hole 29.

According to an embodiment, as illustrated in FIG. 5, the two first recess portions F3 are preferably formed with a line symmetrical shape about a first imaginary straight line AL1 (see FIG. 5) parallel with the lateral direction S and extending through a centroid G and/or formed with a line symmetrical shape about a second imaginary straight line AL2 (see FIG. 5) parallel with the longitudinal direction L and extending through the centroid G. In this way, when the stud pin 50 is installed in the pin inserting hole 29, the installing fingers can easily grip the stud pin 50 with a target orientation.

According to an embodiment, as illustrated in FIG. 5, the four second recess portions F4 are preferably formed with a line symmetrical shape about a first imaginary straight line AL1 parallel with the lateral direction S and extending through the centroid G and/or formed with a line symmetrical shape about a second imaginary straight line AL2 parallel with the longitudinal direction L and extending through the centroid G. In this way, when the stud pin 50 is installed in the pin inserting hole 29, the installing fingers can easily grip the stud pin 50 with a target orientation.

According to an embodiment, as illustrated in FIG. 5, in the case of the profile shape 62 includes two of the linear portions F5, the two linear portions F5 are preferably formed with a line symmetrical shape about a first imaginary straight line AL1 parallel with the lateral direction S and extending through the centroid G and/or formed with a line symmetrical shape about a second imaginary straight line AL2 parallel with the longitudinal direction L and extending through the centroid G. In this way, when the stud pin 50 is installed in the pin inserting hole 29, the installing fingers can easily grip the stud pin 50 with a target orientation.

According to an embodiment, as illustrated in FIG. 5, the two second protrusion portions F2 include two linear portions F5 parallel with the longitudinal direction L. The linear portions F5 are preferably the portions projecting the most in the lateral direction S. Also, both ends of the two linear portions F5 preferably connect with two of the second recess portions F4 of the four second recess portions F4. In other words, one second protrusion portion F2 is preferably formed by one of the linear portions F5 and two of the second recess portions F4. In this way, with the lower flange 56 including the second protrusion portion F2 projecting greatly in the lateral direction S, the holding strength to prevent the stud pin 50 from falling out from the pin inserting hole 29 is increased.

Figure 7A:
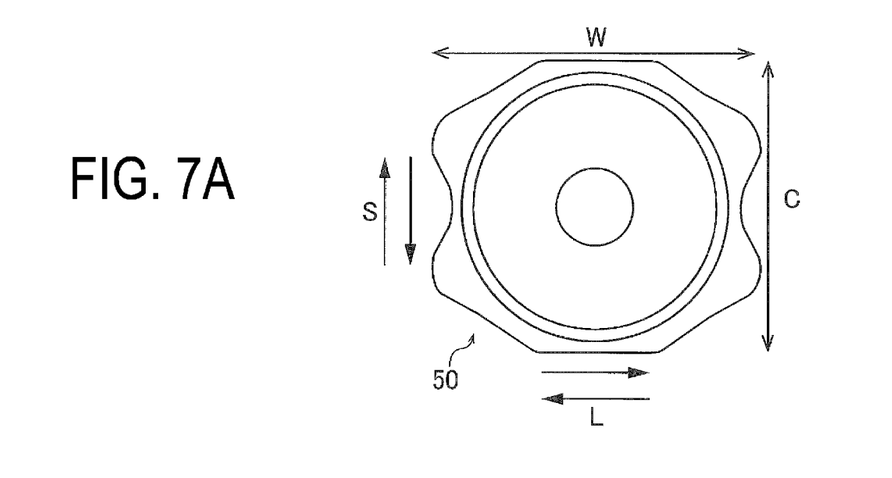
FIGS. 7A and 7B are diagrams illustrating the orientation of the stud pin installed in the tire.
Figure 7B:
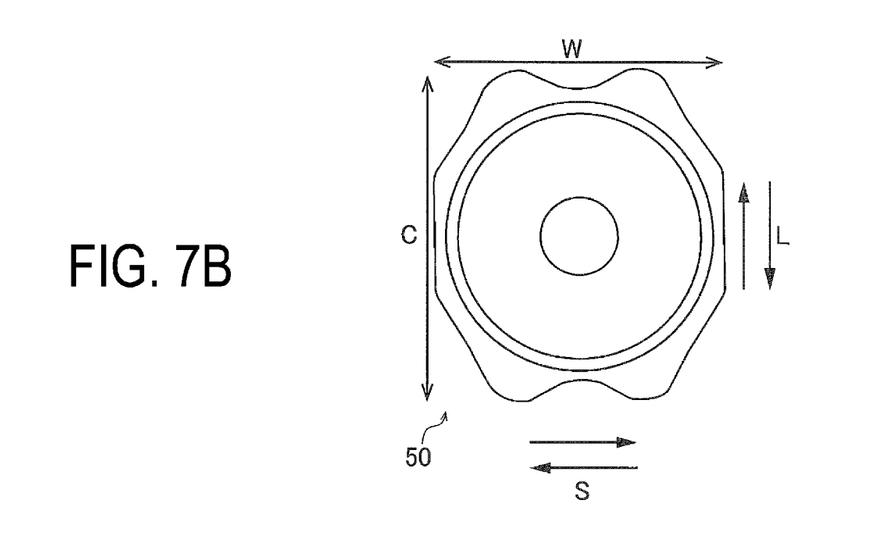

The stud pin 50 including the profile shape 62 of the lower flange 56 with an anisotropic shape is installed in a tire. FIGS. 7A and 7B are diagrams illustrating the orientation of the stud pin 50 installed in the tire.

FIG. 7A illustrates an example in which the stud pin is installed in the pin inserting hole 29 with the longitudinal direction L of the lower flange 56 facing the tire lateral direction W and the lateral direction S being aligned with the arrangement direction facing the tire circumferential direction C. FIG. 7B illustrates an example in which the stud pin is installed in the pin inserting hole 29 with the lateral direction S of the lower flange 56 facing the tire lateral direction W and the longitudinal direction L being aligned with the arrangement orientation of the stud pin 50 facing the tire circumferential direction C.

As illustrated in FIG. 7A, when the stud pin 50 is disposed with the lateral direction S corresponding to the tire circumferential direction C, the stud pin 50 that receives a lateral force as sheer force inclines, collapsing in the pin inserting hole 29. However, the lower flange 56 is tightly fastened by the tread rubber 18 formed corresponding to the undulations formed by the four first protrusion portions F1 of the lower flange 56 at the inner wall surface of the pin inserting hole 29. Thus, a gap is not easily formed (does not come loose) between the stud pin 50 and the pin inserting hole 29 due to the stud pin 50 inclining in the tire lateral direction W. Accordingly, the stud pin 50 does not easily rotate in the pin inserting hole 29. Thus, the stud pin 50 is suppressed from falling out from the pin inserting hole 29 and the lateral force is efficiently transferred from the stud pin 50 to the belt 14 via the tread rubber 18, improving the response of the studded tire to lateral forces. Additionally, the second recess portion F4 is the portion facing an inclined direction with respect to the tire lateral direction W. Thus, even when turning with braking/driving engaged, when the orientation of the lateral force received by the stud pin 50 is inclined, the inner wall surface of the pin inserting hole 29 fastens around the protrusion portions (the first protrusion portions F1 and the second protrusion portions F2) on either side of the second recess portion F4 and the second recess portion F4. This improves the response of the studded tire to lateral forces. In this way, the pin drop resistance when turning and the controllability on snowy and icy road surfaces are increased. Furthermore, the profile shape 62 of the lower flange 56 includes the large second protrusion portion F2 facing the tire circumferential direction C. This increases the holding strength to prevent the movement of the stud pin 50 to incline and fall out from the pin inserting hole when the stud pin 50 receives a large breaking or accelerating force when breaking or driving. As a result, braking and driving properties on icy road surfaces is improved, as well as pin drop resistance when breaking or driving.

As illustrated in FIG. 7B, when the stud pin 50 is disposed with the longitudinal direction L corresponding to the tire circumferential direction C, the stud pin 50 that receives braking force and driving force as sheer force inclines, collapsing in the pin inserting hole 29. However, the lower flange 56 is tightly fastened by the tread rubber 18 formed corresponding to the undulations formed by the four first protrusion portions F1 of the lower flange 56 at the inner wall surface of the pin inserting hole 29. Thus, a gap is not easily formed (does not come loose) between the stud pin 50 and the pin inserting hole 29 due to the stud pin 50 inclining in the tire circumferential direction from the icy road surface. Accordingly, the stud pin 50 does not easily rotate in the pin inserting hole 29. Thus, the stud pin 50 is suppressed from falling out from the pin inserting hole 29 and the breaking or accelerating force is efficiently transferred from the stud pin 50 to the belt 14 via the tread rubber 18, improving the response of the studded tire to braking forces. In other words, the braking ability on ice is improved. Additionally, the second recess portion F4 is the portion facing an inclined direction with respect to the tire circumferential direction W. Thus, even when breaking or accelerating with a slip angle, when the orientation of the breaking or accelerating force received by the stud pin 50 is inclined, the inner wall surface of the pin inserting hole 29 tightly fastens around the protrusion portions (the first protrusion portions F1 and the second protrusion portions F2) on either side of the second recess portion F4 and the second recess portion F4. This improves the response of the studded tire to breaking and accelerating. In this way, the pin drop resistance when braking and the braking and driving properties on snowy and icy road surfaces are increased. Furthermore, the profile shape 62 of the lower flange 56 includes the large second protrusion portion F2 facing the tire lateral direction W. This increases the holding strength to prevent the movement of the stud pin 50 to incline and fall out from the pin inserting hole when the stud pin 50 receives a large lateral force when turning. As a result, controllability on icy road surfaces is improved, as well as pin drop resistance when turning.

In this way, the orientation of the stud pin 50 can be set in accordance with the target characteristics of the studded tire.

Additionally, according to an embodiment, the orientation of the stud pin 50 installed in an inner region near the tire equator line CL of the tread portion is preferably set as the orientation illustrated in FIG. 7A or FIG. 7B, and the orientation of the stud pin 50 installed in an outer region outward from the inner region in the tire lateral direction is preferably set as the orientation illustrated in the other FIG. 7A or FIG. 7B. The degree of the effect on braking and driving properties and controllability depends on the position on the tread portion in the tire lateral direction. Thus, to efficiently improve braking and driving properties and controllability, the orientation of the stud pin 50 illustrated in FIG. 7A or FIG. 7B is preferably selectively selected depending on the position in the tire lateral direction where the stud pin 50 is installed.

Examples, Conventional Example, and Comparative Examples

Stud pins including lower flanges with different profile shapes were manufactured. The manufactured stud pins were embedded in tires 10 with the configuration illustrated in FIGS. 1 to 3 to manufacture studded tire. These studded tires were mounted to a passenger vehicle test vehicle, and the stud pins were evaluated.

The size of each manufactured tire was 205/55R16. The passenger vehicle used was a front-wheel drive sedan with an engine displacement of 2000 cc. The internal pressure condition of the tires was 230 (kPa) for both the front wheels and rear wheels. The load condition of the tires was a 450 kg load on the front wheels and a 300 kg load on the rear wheels. The evaluation items for the stud pins are as follows.

Pin Drop Resistance

The proportion (%) of the number of stud pins remaining in the tread rubber to the total number of mounted stud pins was obtained after the test vehicle had travelled 15000 km on a dry road surface including asphalt road surfaces or concrete road surfaces. A proportion of 95% or greater is evaluated as having no practical problem in terms of pin drop.

Braking Ability on Ice

The test vehicle was driven on an icy road surface, and the travel distance taken upon engaging braking for the test vehicle to go from a speed of 30 km/h to 5 km/h was measured as the braking distance. The reciprocal of the braking distance for each of the examples are expressed as index values, with the reciprocal of the braking distance of the Conventional Example described below being assigned as the reference (index value of 100). Larger index values indicate shorter braking distance and superior braking ability on ice.

Controllability on Ice

Two evaluator drivers drove the test vehicle on an icy road surface of a conditioned closed course and performed a subjective evaluation of controllability. The two scores were averaged and expressed as index values with the score of the Conventional Example being assigned as the reference (index value of 100). Larger index values indicate superior controllability on ice.

Pin Installation Stability

Stud pins were gripped by installing fingers of a stud pin installation device and installed in a tire. The percentage of stud pins correctly installed in the pin inserting holes 29 was found. The stud pins were embedded at an angle with respect to the pin inserting holes 29, and the number of times the stud pins failed to embed in the pin inserting holes 29 was taken as the number of failures. The percentage (%) of the number of failures to the total number of times the stud pin was installed in the tire was subtracted from 100%, and this value was taken as the pin installation stability. A pin installation stability (%) of 95% or greater indicates high pin installation stability.

Tables 1 and 2 show the various parameters and evaluation results of the Conventional Example, Comparative Examples, and Examples.

"Shape of first and second smallest rectangle circumscribing profile shape" in Tables 1 and 2 refers to the shape of either the first or second smallest rectangle illustrated in FIG. 4B. For the Conventional Example, "circle" refers to the profile shape of the lower flange and not the shape of the first and second smallest rectangle. For Comparative Examples 3 and 4 and the Examples, the ratio of the length of the long side to the length of the short side of the "rectangle" is 1:1.13.

In the "protrusion number (first protrusion portion F1, second protrusion portion F2)" in Tables 1 and 2, in the case of the number of first protrusion portions F1 being even, the number protruding in the direction on both sides in the longitudinal direction was the same. The number of the second protrusions F2 was even in all cases, and the number protruding in the direction on both sides in the lateral direction was the same. When the number of the first protrusion portions F1 is three, the number protruding in the direction on both sides of the longitudinal direction was 2 and 1, and when the number of first protrusion portions F1 is 5, the number protruding in the direction on both sides in the longitudinal direction was 3 and 2.

In "Recess depth of first recess portion F3> or = or <recess depth of second recess portion F4" in Tables 1 and 2, "F3=F4" indicates that the recess depths are equal, "F3>F4" indicates that the recess depth of the first recess portion F3 is greater than the recess depth of the second recess portion F4, and "F3<F4" indicates that the recess depth of the second recess portion F4 is greater than the recess depth of the first recess portion F3".

Here, in Comparative Examples 1 and 4 in which the number of first recess portions F1 is two, no first recess portions F3 are provided. In this case, the recess depth of the second recess portion F4 is defined as the recess depth of the second recess portion F4 in Comparative Examples 2, 3.

TABLE 1

|  | Conventional Example | Comparative Example 1 | Comparative Example 2 | Comparative Example 3 | Comparative Example 4 |
| --- | --- | --- | --- | --- | --- |
| Shape of first and second smallest rectangle circumscribing profile shape | Circle | Square | Square | Rectangle | Rectangle |
| Protrusion number (first protrusion portion F1, second protrusion portion F2) | — | 2, 2 | 4, 2 | 3, 2 | 2, 4 |
| Recess depth of first recess portion F3 > or = or < Recess depth of second recess portion F4 | — | — | F3 = F4 | F3 = F4 | — |
| Linear portion F5 | — | Yes | Yes | Yes | Yes |
| Pin drop resistance (%) | 55 | 90 | 92 | 94 | 94 |
| Braking ability on ice | 100 | 102 | 103 | 104 | 102 |

TABLE 1-continued

|                              | Conventional Example | Comparative Example 1 | Comparative Example 2 | Comparative Example 3 | Comparative Example 4 |
|---|---|---|---|---|---|
| Controllability on ice       | 100 | 101 | 102 | 102 | 102 |
| Pin installation stability (%) | 75  | 80  | 98  | 96  | 98  |

TABLE 2

|                              | Example 1 | Example 2 | Example 3 | Example 4 |
|---|---|---|---|---|
| Shape of first and second smallest rectangle circumscribing profile shape | Rectangle | Rectangle | Rectangle | Rectangle |
| Number of protrusion portions (first protrusion portion F1, second protrusion portion F2) | 4, 2 | 5, 2 | 4, 2 | 4, 2 |
| Recess depth of first recess portion F3 > or = or < Recess depth of second recess portion F4 | F3 = F4 | F3 = F4 | F3 > F4 | F3 > F4 |
| Linear portion F5 | Yes | Yes | Yes | No (convex arc shape) |
| Pin drop resistance (%) | 97 | 98 | 100 | 100 |
| Braking ability on ice | 106 | 108 | 108 | 106 |
| Controllability on ice | 104 | 105 | 105 | 104 |
| Pin installation stability (%) | 98 | 98 | 100 | 98 |

As seen from comparing the Conventional Example, Comparative Examples 1 to 4, and Examples 1 to 4, a configuration in which the profile shape 62 of the lower flange 56 has an anisotropic shape with the first smallest rectangle or the second smallest rectangle circumscribing the profile shape 62 being a rectangle, the profile shape 62 includes four or more first protrusion portion F1 projecting toward the longitudinal direction L and two second protrusion portions F2 projecting toward the lateral direction S has improved pin drop resistance compared to the Conventional Example and Comparative Examples 1 to 4. Furthermore, braking ability on ice and controllability on ice is improved compared to the Conventional Example and Comparative Examples 1 to 4. Pin installation stability is also higher.

As seen from comparing Examples 2 and 3, a configuration in which the recess depth of the first recess portion F3 and the recess depth of the second recess portion F4 being equal poses no problems in terms of the evaluation result, however a configuration in which the recess depth of the first recess portion F3 is greater than the recess depth of the second recess portion F4 has improved pin drop resistance and pin installation stability.

Also, as seen from comparing Examples 3 and 4, to improve pin installation stability, the linear portion F5 is preferably provided.

A stud pin and a studded tire according to an embodiment of the present technology have been described above. However, it should be understood that the present technology is not limited to the above embodiments and examples, and may be improved or modified in various ways so long as these improvements or modifications remain within the scope of the present technology.

The invention claimed is:

1. A stud pin installable in a tire, comprising:
a tip comprising an end surface that comes into contact with a road surface;
a body portion that supports the tip so that the tip projects from an end surface on one side of the body portion; and
a lower flange connected to an end of the body portion on an opposite side to the end surface;
a profile shape of the lower flange as viewed from an arrangement direction of the tip, the body portion, and the lower flange being an anisotropic shape in which, of imaginary rectangles circumscribing the profile shape, a first smallest rectangle with a shortest side of its four sides being smallest and/or a second smallest rectangle with a longest side of its four sides being smallest comprise short sides and long sides of different lengths; and
the profile shape comprising four or more first protrusion portions that project toward a longitudinal direction parallel with the long sides and two second protrusion portions that project toward a lateral direction parallel with the short sides; wherein
the first protrusion portions are constituted by two pairs thereof;
the profile shape comprises two first recess portions curved toward a centroid of the profile shape and disposed between each of the pairs of first protrusion portions;
the profile shape further comprises at least one second recess portion curved toward the centroid, disposed between the second protrusion portions and one of the first protrusion portions, and smoothly connect to one of the first protrusion portions; and
a radius of curvature of the first recess portions is smaller than a radius of curvature of the at least one second recess portion.

2. The stud pin according to claim 1, wherein
the at least one second recess portion of the profile shape comprises four second recess portions.

3. The stud pin according to claim 2, wherein a recess depth of the first recess portions is equal to or greater than a recess depth of the four second recess portions.

4. The stud pin according to claim 3, wherein
the two first recess portions are formed with a line symmetrical shape with respect to a first imaginary straight line parallel with the lateral direction that extends through the centroid and/or formed with a line symmetrical shape with respect to a second imaginary straight line parallel with the longitudinal direction that extends through the centroid.

5. The stud pin according to claim 3, wherein
the four second recess portions are formed with a line symmetrical shape with respect to a first imaginary straight line parallel with the lateral direction that extends through the centroid and/or formed with a line symmetrical shape with respect to a second imaginary straight line parallel with the longitudinal direction that extends through the centroid.

6. The stud pin according to claim 5, wherein the two second protrusion portions comprise two linear portions parallel with the longitudinal direction; the linear portions are portions projecting the most in the lateral direction; and both ends of each of the two linear portions connect with two second recess portions of the four second recess portions.

7. A studded tire installed with a stud pin, comprising: a tread portion installed with the stud pin described in claim 6 with the longitudinal direction facing a tire circumferential direction.

8. A studded tire installed with a stud pin, comprising: a tread portion installed with the stud pin described in claim 6 with the lateral direction facing a tire circumferential direction.

9. The stud pin according to claim 2, wherein the two first recess portions are formed with a line symmetrical shape with respect to a first imaginary straight line parallel with the lateral direction that extends through the centroid and/or formed with a line symmetrical shape with respect to a second imaginary straight line parallel with the longitudinal direction that extends through the centroid.

10. The stud pin according to claim 2, wherein the four second recess portions are formed with a line symmetrical shape with respect to a first imaginary straight line parallel with the lateral direction that extends through the centroid and/or formed with a line symmetrical shape with respect to a second imaginary straight line parallel with the longitudinal direction that extends through the centroid.

11. The stud pin according to claim 2, wherein the two second protrusion portions comprise two linear portions parallel with the longitudinal direction; the linear portions are portions projecting the most in the lateral direction; and both ends of each of the two linear portions connect with two second recess portions of the four second recess portions.

12. The stud pin according to claim 2, wherein the two second protrusion portions comprise two linear portions parallel with the longitudinal direction; and the linear portions are portions projecting the most in the lateral direction.

13. The stud pin according to claim 12, wherein the two linear portions are formed with a line symmetrical shape with respect to a first imaginary straight line parallel with the lateral direction that extends through the centroid and/or formed with a line symmetrical shape with respect to a second imaginary straight line parallel with the longitudinal direction that extends through the centroid.

14. The stud pin according to claim 1, wherein the two second protrusion portions comprise two linear portions parallel with the longitudinal direction; and the linear portions are portions projecting the most in the lateral direction.

15. The stud pin according to claim 14, wherein the two linear portions are formed with a line symmetrical shape with respect to a first imaginary straight line parallel with the lateral direction that extends through a centroid and/or formed with a line symmetrical shape with respect to a second imaginary straight line parallel with the longitudinal direction that extends through the centroid.

16. A studded tire installed with a stud pin, comprising: a tread portion installed with the stud pin, the stud pin comprising:
a tip comprising an end surface that comes into contact with a road surface;
a body portion that supports the tip so that the tip projects from an end surface on one side of the body portion; and
a lower flange connected to an end of the body portion on an opposite side to the end surface;
a profile shape of the lower flange as viewed from an arrangement direction of the tip, the body portion, and the lower flange being an anisotropic shape in which, of imaginary rectangles circumscribing the flange profile shape, a first smallest rectangle with a shortest side of its four sides being smallest and/or a second smallest rectangle with a longest side of its four sides being smallest comprise short sides and long sides of different lengths; and
the profile shape comprising four or more first protrusion portions that project toward a longitudinal direction parallel with the long sides and two second protrusion portions that project toward a lateral direction parallel with the short sides,
the longitudinal direction facing a tire circumferential direction; wherein
the first protrusion portions are constituted by two pairs thereof;
the profile shape comprises two first recess portions curved toward a centroid of the profile shape and disposed between each of the pairs of first protrusion portions;
the profile shape further comprises at least one second recess portion curved toward the centroid, disposed between the second protrusion portions and one of the first protrusion portions, and smoothly connect to one of the first protrusion portions; and
a radius of curvature of the first recess portions is smaller than a radius of curvature of the at least one second recess portion.

17. A studded tire installed with a stud pin, comprising: a tread portion installed with the stud pin, the stud pin comprising:
a tip comprising an end surface that comes into contact with a road surface;
a body portion that supports the tip so that the tip projects from an end surface on one side of the body portion; and
a lower flange connected to an end of the body portion on an opposite side to the end surface;
a profile shape of the lower flange as viewed from an arrangement direction of the tip, the body portion, and the lower flange being an anisotropic shape in which, of imaginary rectangles circumscribing the flange profile shape, a first smallest rectangle with a shortest side of its four sides being smallest and/or a second smallest rectangle with a longest side of its four sides being smallest comprise short sides and long sides of different lengths; and
the profile shape comprising four or more first protrusion portions that project toward a longitudinal direction parallel with the long sides and two second protrusion portions that project toward a lateral direction parallel with the short sides, the lateral direction facing a tire circumferential direction; wherein the first protrusion portions are constituted by two pairs thereof;

the profile shape comprises two first recess portions curved toward a centroid of the profile shape and disposed between each of the pairs of first protrusion portions;

the profile shape further comprises at least one second recess portion curved toward the centroid, disposed between the second protrusion portions and one of the first protrusion portions, and smoothly connect to one of the first protrusion portions; and a radius of curvature of the first recess portions is smaller than a radius of curvature of the at least one second recess portion.

* * * * *